(12) United States Patent
Moshchuk et al.

(10) Patent No.: US 8,983,722 B2
(45) Date of Patent: Mar. 17, 2015

(54) SYSTEM AND METHOD FOR VEHICLE ROLLOVER PREDICTION

(75) Inventors: Nikolai K. Moshchuk, Grosse Pointe, MI (US); Shih-Ken Chen, Troy, MI (US); Flavio Nardi, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 13/323,014

(22) Filed: Dec. 12, 2011

(65) Prior Publication Data
US 2013/0151075 A1 Jun. 13, 2013

(51) Int. Cl.
*B60G 17/016* (2006.01)
*B60G 17/015* (2006.01)

(52) U.S. Cl.
CPC ............ *B60G 17/015* (2013.01); *B60G 17/016* (2013.01); *B60G 2400/52* (2013.01); *B60G 2400/64* (2013.01); *B60G 2800/9124* (2013.01)
USPC ............................................. 701/38; 340/440

(58) Field of Classification Search
CPC ................. B60G 2800/9124; B60G 2400/204; B60W 2720/18
USPC ................................................. 701/36, 38, 45
See application file for complete search history.

(56) References Cited

U.S. PATENT DOCUMENTS

| | | | |
|---|---|---|---|
| 6,301,536 B1 * | 10/2001 | Vaessen et al. | 701/45 |
| 6,535,800 B2 | 3/2003 | Wallner | |
| 6,600,414 B2 * | 7/2003 | Foo et al. | 340/440 |
| 6,654,674 B2 | 11/2003 | Lu et al. | |
| 6,732,024 B2 | 5/2004 | Rekow et al. | |
| 7,571,039 B2 * | 8/2009 | Chen et al. | 701/38 |
| 7,672,765 B2 * | 3/2010 | Moshchuk et al. | 701/38 |
| 7,788,007 B2 | 8/2010 | Moshchuk et al. | |
| 2003/0005764 A1 * | 1/2003 | Colarelli et al. | 73/462 |
| 2004/0024505 A1 | 2/2004 | Salib et al. | |
| 2006/0064213 A1 * | 3/2006 | Lu et al. | 701/37 |
| 2007/0162202 A1 * | 7/2007 | Moshchuk et al. | 701/38 |
| 2007/0162204 A1 * | 7/2007 | Moshchuk et al. | 701/38 |
| 2010/0108231 A1 * | 5/2010 | Lamontia et al. | 152/565 |
| 2012/0253608 A1 * | 10/2012 | Aoki et al. | 701/49 |

OTHER PUBLICATIONS

Moshchuk et al., "Vehicle Rollover Detection Index", Proceedings of IMECE2008 2009 ASME International Mechanical Engineering Congress and Exposition, Lake Buena Vista, Florida, USA, Nov. 13-Nov. 19, 2009.
B. Chen and H. Peng, "Rollover Warning for Articulated Vehicles Based on a Time to Rollover Metric," Proceedings of the 1999 ASME International Congress and Exposition, Knoxville, TN, Nov. 1999.

* cited by examiner

*Primary Examiner* — Helal A Algahaim
*Assistant Examiner* — Shardul Patel
(74) *Attorney, Agent, or Firm* — Mark S. Cohen; Pearl Cohen; Zedek Latzer Baratz LLP (57) ABSTRACT

A rollover avoidance method may include determining tire loading for at least two tires of a vehicle. A stability of the vehicle with regard to rolling over may be predicted based at least on the determined tire loading. The vehicle may be controlled at least on the basis of the predicted stability.

10 Claims, 6 Drawing Sheets

SYSTEM AND METHOD FOR VEHICLE ROLLOVER PREDICTION

FIELD OF THE INVENTION

The present invention is related to evaluation of a likelihood of vehicle rollover based on, for example, sensor measured data, vehicle dynamics constraints, and other information.

BACKGROUND OF THE INVENTION

Many vehicles are equipped with systems and devices to semi-autonomously or autonomously control a vehicle so as to avoid rolling over. Such systems are especially advantageous for a vehicle with a relatively high center of gravity, such as a truck or a sport utility vehicle (SUV). However, inclusion of such systems in a vehicle with a low center of gravity, such as a sedan, may also enhance handling ability. Such rollover avoidance control may include differential braking control, rear wheel steering control, front-wheel steering control, combinations of the above, or other methods.

A rollover avoidance controller may receive information regarding a state of the vehicle from various sensors. The rollover avoidance controller may process the received information in controlling the vehicle. The rollover avoidance controller may, on the basis of the processed information, control the vehicle so as to prevent rollover.

SUMMARY OF THE INVENTION

A rollover avoidance method may include determining tire loading for at least two tires of a vehicle. A stability of the vehicle with regard to rolling over may be predicted based at least on the determined tire loading. The vehicle may be controlled at least on the basis of the predicted stability.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In accordance with an embodiment of the invention, a rollover avoidance or prediction system may be configured to predict an impending rollover event or a tendency of a vehicle to roll over while being operated. The rollover avoidance or prediction system may be configured to receive information from vehicle sensors. The sensors may include, among others, sensors that indicate wheel loading on least some of the wheels of the vehicle. For example, sensors may be incorporated into a tire (for example a "smart tire") or a wheel hub bearing (for example a "smart wheel") that measure a vertical force on each of the wheels. From the sensor data, a value indicative of a distribution of relative loading among the tires of the vehicle may be calculated. An example of such an indicative value is a tire load lateral transfer (TLLT) value that indicates the relative lateral (right-left) distribution of forces between tires of a pair of co-axial or corresponding tires (e.g. two front tires, two rear tires, a pair of tires connected to a single axle, or a pair of tires at corresponding front-rear positions along the length of the vehicle)). Another example of such an indicative value is a function of a time duration that a tire is airborne (e.g. the vertical force on that tire is substantially equal to zero). (It should be understood that, unless indicated otherwise, the terms "wheel" and "tire" are used herein interchangeably. Unless indicated otherwise, statements referring to tires should be understood as equally applying to a wheel that is not provided with a rubber tire.)

One or more such values that are indicative of relative tire loading, as well as other indicative values that may be related to a tendency of a vehicle to roll (e.g. a current roll energy of the vehicle, or a current rate of change of the roll energy) may be used to calculate a single roll stability indicator (RSI) value. For example, terms that incorporate the various indicative values may be each multiplied by appropriate weight coefficients and added together to yield the RSI value. Values of one or more of the weight coefficients may be dependent on a current vehicle speed.

The value of the RSI may be calibrated to indicate or predict one or more rollover-related events or conditions. For example, a calculated RSI value compared with one or more predetermined threshold values or ranges. The comparison may indicate a current state of the vehicle. On the basis of the indicated state, the rollover avoidance system may control the vehicle so as to prevent, or reduce the probability of, the vehicle rolling over.

For example, a calculated RSI value in one range of values may indicate that wheels of the vehicle are currently firmly on the ground. In this case, no controlling of the vehicle by the rollover avoidance system may be necessary. A calculated RSI value in a different range of values may indicate when wheels of the vehicle start to lift off the ground. The rollover avoidance system may then control the vehicle so as to restore rollover stability of the vehicle so as to prevent or inhibit rolling over of the vehicle. For example, the rollover avoidance system may apply partial braking on one or more wheels, may adjust a steering wheel, or may stiffen a vehicle suspension. A calculated RSI value in yet another range of values may indicate that wheels of the vehicle have lifted off the ground (e.g. at least by about 50 millimeters or another distance). In this case, the rollover avoidance system may intensify controlling actions. Finally, calculated RSI value in yet another range of values may indicate imminent rolling over of the vehicle. In this case, the rollover avoidance system may apply emergency braking to slow the vehicle immediately.

Figure 1:
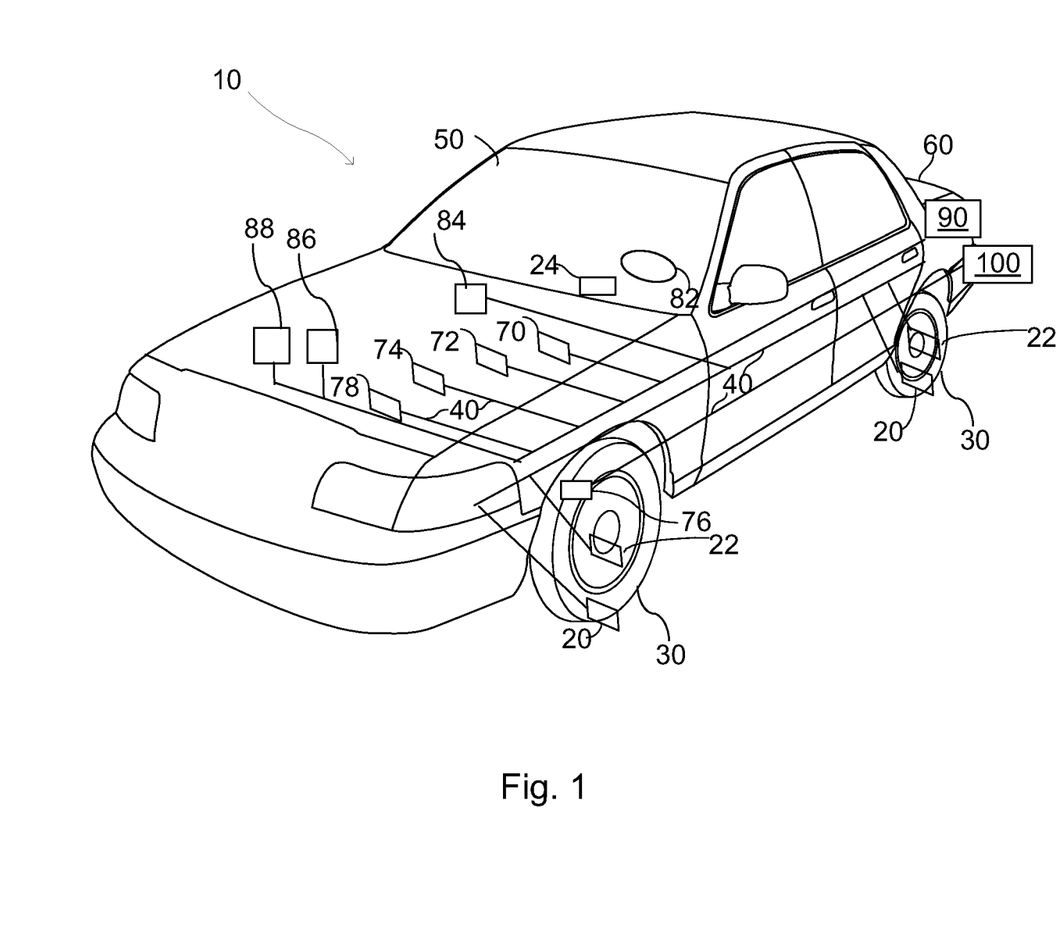
FIG. 1 is a schematic diagram of a vehicle with a rollover avoidance system in accordance with an embodiment of the invention.

FIG. 1 is a schematic diagram of a vehicle with a rollover avoidance system in accordance with an embodiment of the invention.

A vehicle or host vehicle 10 (e.g., a truck, SUV, bus, car, motorized cart, or another vehicle with at least one pair of coaxially arranged wheels) may include a rollover avoidance or prediction system 100. Rollover avoidance or prediction system 100 may operate in conjunction with or separate from one or more automatic vehicle control systems, autonomous driving applications, or vehicle automated control systems 90. Vehicle automated control system 90 may, for example, be an automated steering system or an automated braking system. One or more vehicle automated control systems 90 may be components of rollover avoidance system 100, or vehicle automated control systems 90 may be separate from rollover avoidance system 100. Vehicle automated control systems 90 may, when engaged, fully or partially control the steering or braking of the vehicle, or alter or reduce driver (e.g. operator of vehicle 10) steering control input via steering wheel 82 or brake control 24 (e.g. a brake pedal or hand brake).

One or more sensors may be attached to or associated with the vehicle 10. In one embodiment of the present invention, vehicle 10 may include one or more devices or sensors to measure vehicle steering input, vehicle steering conditions, vehicle steering parameters, vehicle dynamics, driver input, or other vehicle related conditions or measurements. The vehicle dynamics measurement devices may include one or more steering angle sensors 70 (e.g., connected to steering wheel 82 or another component of the steering system). The vehicle dynamics measurement devices may also include an accelerometer 72, speedometer 74, wheel speed sensor 76, inertial measurement unit (IMU) 78, gear shift position sensors 84, gas pedal position sensor 86, brake pedal position sensor 88, or other or different devices.

The vehicle dynamics measurement devices may include a tire force or load sensor 20 in each of some or all of tires 30. For example, a tire force sensor 20 may measure an increase of pressure of air or fluid in a tire of vehicle 10, or of a stress or strain of the tire, which be indicative of a vertical force that is exerted by (or on) a tire 30. The vehicle dynamics measurement devices may also include a wheel bearing force or load sensor 22, e.g. in each of some or all of the wheel hubs of wheels of vehicle 10. A wheel bearing force sensor 22 may measure a force or stress exerted on or applied to a wheel bearing (or hub or axle) of the wheel, which may be indicative of a vertical force exerted by the associated tire.

The vehicle dynamics measurement devices may measure driver input or vehicle dynamics parameters including lateral (e.g., angular or centripetal) acceleration, longitudinal acceleration, vertical acceleration, steering torque, steering direction, steering wheel angle, yaw-rate, lateral and longitudinal velocity, wheel rotation velocity and acceleration, and other vehicle dynamics characteristics of vehicle 10. The vehicle dynamics measurement device(s) may also measure vertical forces on each of at least one of the tires of vehicle 10. The measured vehicle dynamics, vehicle conditions, steering measurements, steering conditions, or driver input information may be sent or transferred to rollover prediction or avoidance system 100 via, for example, a wire link 40 (e.g., a controller area network (CAN) bus, Flexray bus, Ethernet cable) or a wireless link. The measured vehicle dynamics, vehicle conditions, or driver input information data may be used by rollover avoidance system 100 or another system to determine a current risk or likelihood of rolling over, and to calculate a desired operation of vehicle 10 so as to minimize the possibility or likelihood of rolling over.

In one embodiment of the present invention, rollover avoidance or prediction system 100 may include or be included in a computing device mounted on the dashboard of the vehicle, in passenger compartment 50 (or cab), or in cargo area 60 (e.g. a trunk). In alternate embodiments, rollover avoidance system 100 may be located in another part of the vehicle, may be located in multiple parts of the vehicle, or may have all or part of its functionality remotely located (e.g., in a remote server or in a portable computing device such as a cellular telephone).

While various sensors and inputs are discussed, in some embodiments only a subset (e.g. one) type of sensor or input may be used.

Figure 2:
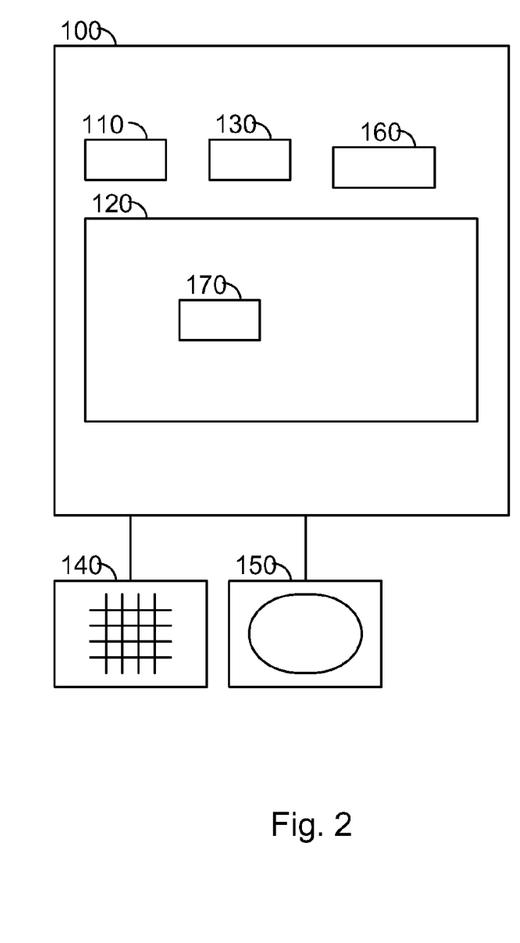
FIG. 2 is a schematic diagram of a rollover avoidance system in accordance with an embodiment of the invention.

FIG. 2 is a schematic diagram of a rollover avoidance or prediction system in accordance with an embodiment of the invention Rollover avoidance or prediction system 100 may include one or more processors or controllers 110, memory 120, long term storage 130, input devices or areas 140, and output devices or areas 150. Input devices or areas 140 may include, for example, a touchscreen, a keyboard, microphone, pointer device, or other device. Output devices or areas 150 may include, for example, a display, screen, audio device such as speaker or headphones, or other device. Input devices or areas 140 and output devices or areas 150 may be combined into, for example, a touch screen display and input which may be part of system 100.

Rollover avoidance or prediction system 100 may include a clock 160. Clock 160 may be incorporated into, or communicate with, a processor or controller 110. Clock 160 may be operated or read, for example, so as to determine a time when an event occurred or a duration of an event.

System 100 may include one or more databases 170, which may include, for example, coefficients, thresholds, calibration information for converting sensor signals to physical quantities, or other information. Databases 170 may be stored all or partly in one or both of memory 120, long term storage 130, or another device.

Processor or controller 110 may be, for example, a central processing unit (CPU), a chip or any suitable computing or computational device. Processor or controller 110 may include multiple processors, and may include general-purpose processors and/or dedicated processors such as graphics processing chips. Processor 110 may execute code or instructions, for example, stored in memory 120 or long-term storage 130, to carry out embodiments of the present invention.

Memory 120 may be or may include, for example, a random access memory (RAM), a read only memory (ROM), a dynamic RAM (DRAM), a synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a compact disk (CD) drive, a CD-recordable (CD-R) drive, a universal serial bus (USB) device or other suitable removable and/or fixed storage unit, and may include multiple or a combination of such units.

Figure 3:
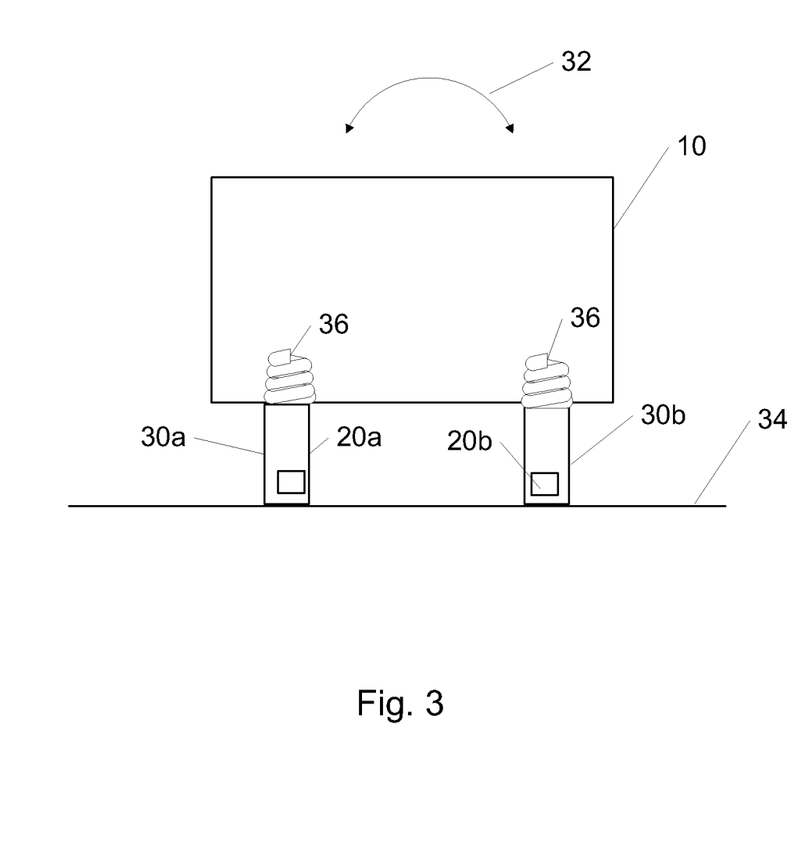
FIG. 3 is a schematic diagram of a transverse cross section of a vehicle with a rollover avoidance control system in accordance with embodiments of the invention.

FIG. 3 is a schematic diagram of a transverse cross section of a vehicle with a rollover avoidance control system in accordance with embodiments of the invention.

Vehicle 10 may be supported by or traveling on roadway 34. (Roadway 34 should be understood as representing any surface that is capable of supporting vehicle 10 or on which vehicle 10 may travel.) For example, vehicle 10 may be traveling in a direction that is perpendicular to, or at an oblique angle to, the plane of FIG. 3. For convenience of the description, we assume that vehicle 10 is oriented with its front end facing into the plane of FIG. 3, such that left and right sides of in FIG. 3 correspond to left and right sides of vehicle 10. However, the description would equally apply if the orientation were reversed.

Motion of vehicle 10 may cause a rolling motion of vehicle 10, as indicated by arrow 32. For example, rolling of vehicle 10 may result from various turning maneuvers. During some turning maneuvers, a combination of centripetal forces and inertial forces (e.g. centrifugal forces) may tend to roll vehicle 10. Excessive rolling may noticeably tip or overturn vehicle 10.

Vehicle 10 may be supported by tires, at least some of the tires being arranged in pairs of substantially coaxial tires. The tires of a pair of substantially coaxial tires may be connected to a single axle (but need not be), or may be positioned at similar distances from a front or rear end of vehicle 10. For example, left tire 30a and right tire 30b may represent a pair of substantially coaxial tires on the left and right sides, respectively, of vehicle 10. Left tire 30a and right tire 30b may each be connected to vehicle 10 via a suspension 36. Left tire 30a may be provided with left tire force sensor 20a and right tire 30b with right tire force sensor 20b. (In place of, or in addition to, left tire force sensor 20a and right tire force sensor 20b, left tire 30a and right tire 30b may be provided with another force sensor, such as a wheel bearing force sensor or similar sensor, which measures a force exerted by or applied to each tire. For convenience, only tire force sensors are shown in FIG. 3 and discussed in connection with FIG. 3. Thus, left tire force sensor 20a and right tire force sensor 20b should be understood as being representative of any sensor capable of measuring a force between a tire and roadway.) Left tire force sensor 20a and right tire force sensor 20b may sense a force between each of left tire 30a and right tire 30b, respectively, and roadway 34.

In accordance with an embodiment of the invention, left tire force sensor 20a and right tire force sensor 20b may be operated to generate signals that are indicative of forces between left tire 30a and right tire 30b, respectively, and the road or ground. For example, a signal generated by one of left tire force sensor 20a or right tire force sensor 20b may be processed (e.g. via application of calibration data or functions) to yield a measured tire force value between each of left tire 30a or right tire 30b, respectively, and roadway 34.

An RSI value may be at least partially calculated on the basis of the measured force values. For example, various quantities that may be incorporated in a calculation of an RSI value may be based on the measured force values. Examples of such quantities include a TLLT value for a pair of tires, and an airborne indicator (ABI) value.

For example, a TLLT value may be calculated for a pair of tires. If a vertical force between left tire 30a and roadway 34 is represented by $F_L$, and if a vertical force between right tire 30b and roadway 34 is represented by $F_R$, the TLLT value may be calculated as, for example:

$$TLLT = \frac{F_L - F_R}{F_L + F_R}$$

Thus, the TLLT value may range from about 1, when vertical force $F_R$ on right tire 30b is close to zero, to about −1 when vertical force $F_L$ on left tire 30a is close to zero. Either such value may be indicative of increased roll of vehicle 10 or increased likelihood of vehicle 10 rolling over. A TLLT value close to zero, on the other hand, may be indicative of an approximately equal distribution of force between left tire 30a and right tire 30b and little roll. As another example, an alternative TLLT value may be calculated with $F_R$ and $F_L$ interchanged, with the significance of positive and negative values of the alternative TLLT also being interchanged.

A separate TLLT value may be calculated for each pair of tires of the vehicle. For example, for a four-wheeled vehicle, a front $TLLT_f$ may be calculated for a front pair of tires, and a separate rear $TLLT_r$ may be calculated for a rear pair of tires.

The calculated TLLT values may be incorporated into a calculation of an RSI value. For example, in accordance with an embodiment of the invention, the RSI value may be calculated as or by a sum of terms. A database, memory, or data storage device (e.g., memory 120, database 170, or similar device) may include values of coefficients for each of the terms. For example, values of at least some of the coefficients may depend on a measured speed of vehicle 10. For example, a speed of vehicle 10 may be measured by accepting input from or operating speedometer 74 or wheel speed sensor 76 (FIG. 1). As another example, a speed of vehicle 10 may be calculated or inferred from measurements made by one or more other sensors (e.g. an instrument or sensor that is configured to measure a position of vehicle 10 at successive times with respect to a coordinate system or to a stationary object). The coefficients may be determined from vehicle testing (e.g. measurements made on vehicles being driven in a controlled manner under controlled conditions, or on measurements made on a stationary vehicle), from testing using model vehicles, or from simulations or other calculations.

For example, an RSI may include one or more terms of the form $c_{TLLTf}TLLT_f$ or $c_{TLLTr}TLLT_r$, where $c_{TLLTf}$ and $c_{TLLTr}$ represent appropriate coefficients. Coefficients $c_{TLLTf}$ and $c_{TLLTr}$ may be specific to a particular type or model of vehicle. The values of coefficients $c_{TLLTf}$ and $c_{TLLTr}$ may depend on a vehicle speed, or on other conditions (e.g. road or environmental conditions, or on vehicle loading). In one example, $c_{TLLTf}$ and $C_{TLLTr}$ may be equal to about 0.9, or another value.

As another example, an ABI value may be based on measured force values. For example, an ABI value may be based on a measured duration of a tire of a pair of tires having lifted off the ground. For example, when a tire of a pair is lifted off the ground, a force measured by a vertical force sensor for that tire may indicate a vertical force that is close to zero (e.g. within a threshold of zero). Concurrently, force measured by a vertical force sensor for the other tire of the pair may indicate a vertical force that is greater than zero (e.g. greater than a threshold force value). In this case, the TLLT value for the pair may be close to 1 or −1 (e.g. within a threshold value).

When it is detected that the tire has lifted off the ground (e.g., tipped up), the rollover avoidance system may read the time from a clock, such as clock 160 (FIG. 2). The rollover avoidance system may continue to monitor the force sensors and calculate the duration or time elapsed, $\tau$, since the tire left the ground. An ABI value may be based on the value of $\tau$. For example, an ABI value may be proportional to $\tau$ or to a power of $\tau$ (e.g. $\tau^3$), or have another functional relationship to $\tau$.

A separate ABI value may be calculated for each pair of tires of the vehicle. For example, for a four-wheeled vehicle, a front $ABI_f$ may be calculated for a front pair of tires, and a separate rear $ABI_r$ may be calculated for a rear pair of tires.

The calculated ABI values may be incorporated into a calculation of an RSI value. For example, the RSI value may be calculated as a sum of terms with stored values of coefficients for terms based on ABI. For example, values of the ABI coefficients may depend on a measured speed of vehicle 10. The coefficients may be determined from vehicle testing (e.g. measurements made on vehicles being driven in a controlled manner under controlled conditions or on measurements made on a stationary vehicle), from testing using model vehicles, or from simulations or other calculations.

For example, a calculation of an RSI value may include adding one or more terms of the form $c_{ABIf}ABI_f$ or $c_{ABIr}ABI_r$, where $c_{ABIf}$ and $c_{ABIr}$ represent appropriate coefficients. Coefficients $c_{ABIf}$ and $c_{ABIr}$ may be specific to a particular type or model of vehicle. The values of coefficients $c_{ABIf}$ and $c_{ABIr}$ may depend on a vehicle speed, or on other conditions (e.g. road or environmental conditions, or on vehicle loading). In one example, $c_{ABIf}$ and $c_{ABIr}$ may be equal to about 0.03 (with appropriate units), or another value.

Calculation of an RSI value, in accordance with an embodiment of the invention, may include calculations of additional terms or quantities that are not related to measured tire forces or force distributions. For example, a calculation of an RSI value may include calculating a roll energy E or a rate of change of a roll energy E.

Figure 4:
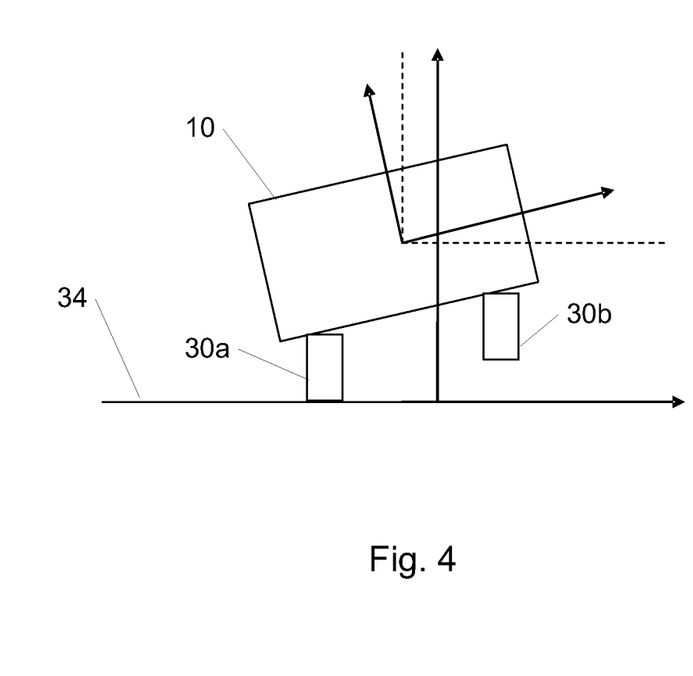
FIG. 4 is a schematic diagram illustrating vehicle dynamics of a vehicle in connection with operation of a rollover avoidance control system in accordance with embodiments of the invention.

FIG. 4 is a schematic diagram illustrating vehicle dynamics of a vehicle in connection with operation of a rollover avoidance control system in accordance with embodiments of the invention. A reference system xyz with origin O may be fixed to a sprung mass of vehicle 10 and move as the sprung mass of vehicle 10 moves or rotates. (The axis x is perpendicular to the plane of FIG. 4.) Reference system xyz at any point in time may be rotated by an angle $\phi$ relative to fixed reference system XYZ with origin $O_1$. (X is perpendicular to the plane of FIG. 4, with Y being a horizontal axis and Z being a vertical axis.)

Calculation of a roll energy E or a roll energy rate $\dot{E}$ may be based on quantities that may either be measured by sensors or derived from sensor measurements. Such quantities may include a roll rate, a yaw rate, a lateral acceleration, a vehicle speed, or a steering wheel (hand wheel) position. A roll angle or roll angle rate may be estimated or derived from the data. For example, a roll energy E and roll energy rate $\dot{E}$ may be calculated from a known mass distribution and properties of vehicle 10. For example, such properties may include, dimensions, masses, and moments of inertia of vehicle 10 (or of a sprung mass and unsprung mass of vehicle 10), and stiffness (various moduli and spring constants) of a suspension of vehicle 10.

For example, a calculation of an RSI value may include calculation of terms of the form:

$$c_E \frac{E}{E_{2WL}} + c_{Erate} \frac{\dot{E}}{\dot{E}_{critical}}$$

where $E_{2WL}$ represents a roll energy sufficient to lift two wheels (e.g. a front wheel and a rear wheel) off the ground, and $\dot{E}_{critical}$ represents a critical roll energy rate for causing vehicle 10 to overturn. For example, values of $E_{2WL}$ and $\dot{E}_{critical}$ may be determined by vehicle testing or from calculations or simulations. As a specific example, $E_{2WL}$ for a typical SUV may be about 1000 Newton-meters or another value, and $\dot{E}_{critical}$ for the same SUV may be about 12,500 Newton-meters per second or another value. Other formulas may be used.

Values of coefficients $c_E$ and $c_{Erate}$ may be dependent on vehicle speed. For example, values of $c_E$ may vary approximately linearly from 0.8 when the vehicle is approximately stationary, to 1.2 when the vehicle speed is about 120 kilometers per hour (kph), or have other values or speed dependencies. Similarly, for example, values of $c_{Erate}$ may vary approximately linearly from 0.9 when the vehicle is approximately stationary, to 1.1 when the vehicle speed is about 120 kph, or have other values or speed dependencies. Values of coefficients $c_E$ and $c_{Erate}$ may be determined from vehicle testing or from calculations or simulations.

Thus, in accordance with an embodiment of the invention, an RSI value may be calculated as:

$$RSI = c_E \frac{E}{E_{2WL}} + c_{Erate} \frac{\dot{E}}{\dot{E}_{critical}} + c_{TLLTf}TLLT_f + c_{TLLTr}TLLT_r + c_{ABIf}ABI_f + c_{ABIr}ABI_r$$

Other formulas may be used. In accordance with an embodiment of the invention, an action by the rollover avoidance system may be based on a current RSI value that is based on measured sensor value. In accordance with another embodiment of the invention, an action by the rollover avoidance system may be based on a predicted RSI value. For example, a model may be used to predict a future state of the vehicle and a predicted future RSI value based on currently measured sensor values and on basic assumptions. For example, a prediction may be based on an assumption that a driver of the vehicle does not move a steering wheel during the period of the prediction (e.g. 0.2 to 0.5 seconds or another period of time).

Rollover avoidance or prediction system 100 may be passive or operate in the background during normal vehicle operation.

Figure 5:
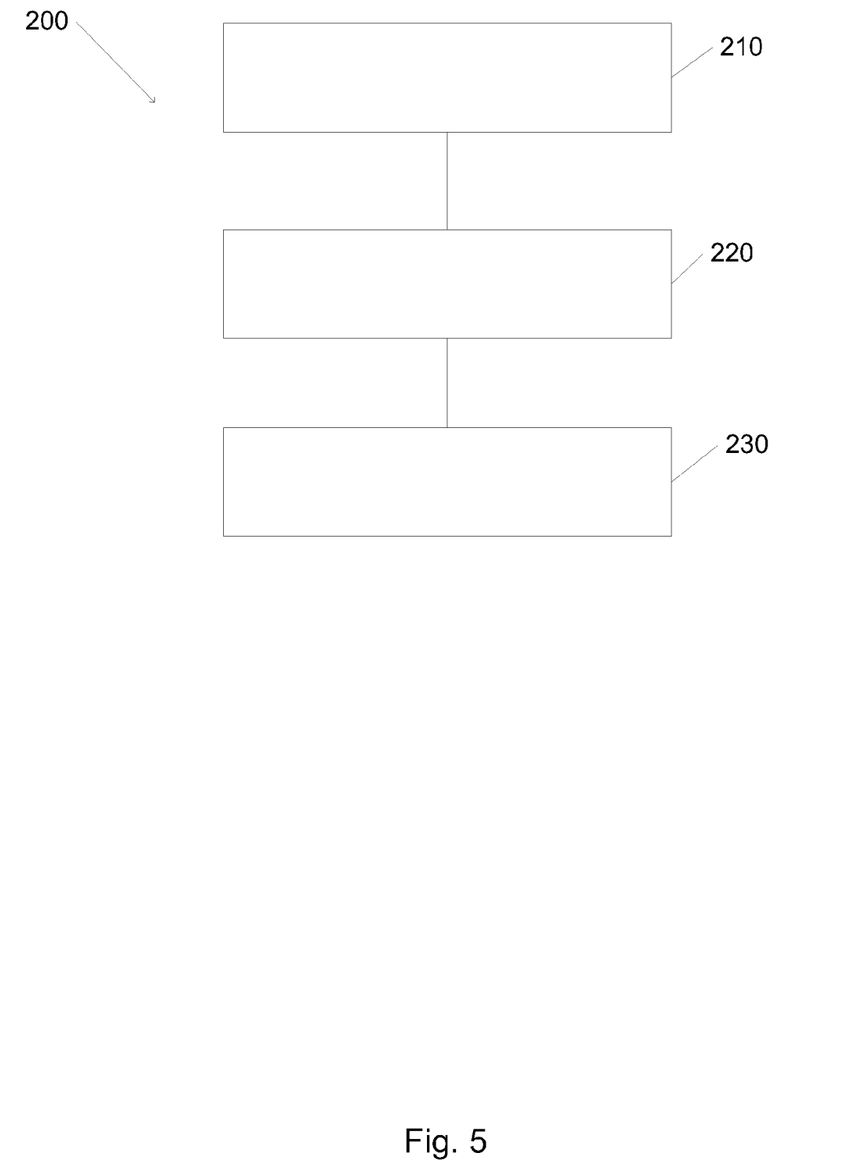
FIG. 5 is a flowchart of a method for operation of a rollover avoidance method in accordance with an embodiment of the invention.

FIG. 5 is a flowchart of a method for operation of a rollover avoidance or prediction method in accordance with an embodiment of the invention. Rollover avoidance or prediction method 200 may be implemented by a rollover avoidance system of a vehicle or another system of the vehicle. For example, rollover avoidance method 200 may be performed periodically, e.g. at predetermined time intervals or at time intervals that are determined in accordance with sensed conditions (e.g. vehicle speed, road curvature, or environmental conditions). As another example, rollover avoidance method 200 may be performed in response to one or more sensed conditions (e.g., based on tire loading or other measured loads).

It should be understood with respect to this flowchart and with respect to all flowcharts referred to herein, that the division of the illustrated method into separate operations indicated by separate blocks has been selected for convenience and clarity only. The illustrated method could be divided in an alternative manner with equivalent results. All such alternative division of the method into operations should be considered as falling within the scope of embodiments of the invention. Similarly, unless indicated otherwise, the blocks and the represented operations are shown in an order that is selected for convenience and clarity only. Unless indicated otherwise, illustrated operations of the illustrated method could be performed in alternate order or concurrently with equivalent results. All such reordering of blocks of the flowchart and the corresponding operations should be considered as falling within the scope of embodiments of the invention.

In performing rollover avoidance method 200, a load on tires of the vehicle may be determined or measured. For example, a sensed tire or wheel load on at least some (e.g. at least two) of the tires of the vehicle, e.g. including a pair of substantially coaxial tires or wheels, may be obtained from one or more appropriate sensors (block 210). For example, the sensors may include a tire force sensor or a wheel bearing force sensor. One or more derivative quantities may be calculated in connection with the obtained tire loading, such as a TLLT value or an ABI value.

A stability of the vehicle may be calculated or predicted (block 220). For example a stability of the vehicle with regard to rolling may be calculated or predicted based at least on the determined tire loading. For example, an RSI value may be calculated that is based at least partially on the sensed tire loading, or on a quantity that is derivable from the tire loading. The stability calculation may also be based on quantities related to vehicle motion, such as a roll energy or roll energy rate. The stability calculation may include stored coefficients, factors, or parameters whose values or functional forms had been previously determined from previously performed testing or experiments on actual vehicles, from calculations or simulations of vehicle performance, or from projections based on currently measured data.

The vehicle may be controlled to perform an action based on the calculated stability (block 230). For example, a steering wheel may be turned, or a brake may be applied to one or more wheels of the vehicle in such a manner so as to (e.g. as indicated by previous testing or simulations, or by a projection based on currently sensed data) increase vehicle stability and reduce the likelihood of rollover.

Figure 6:
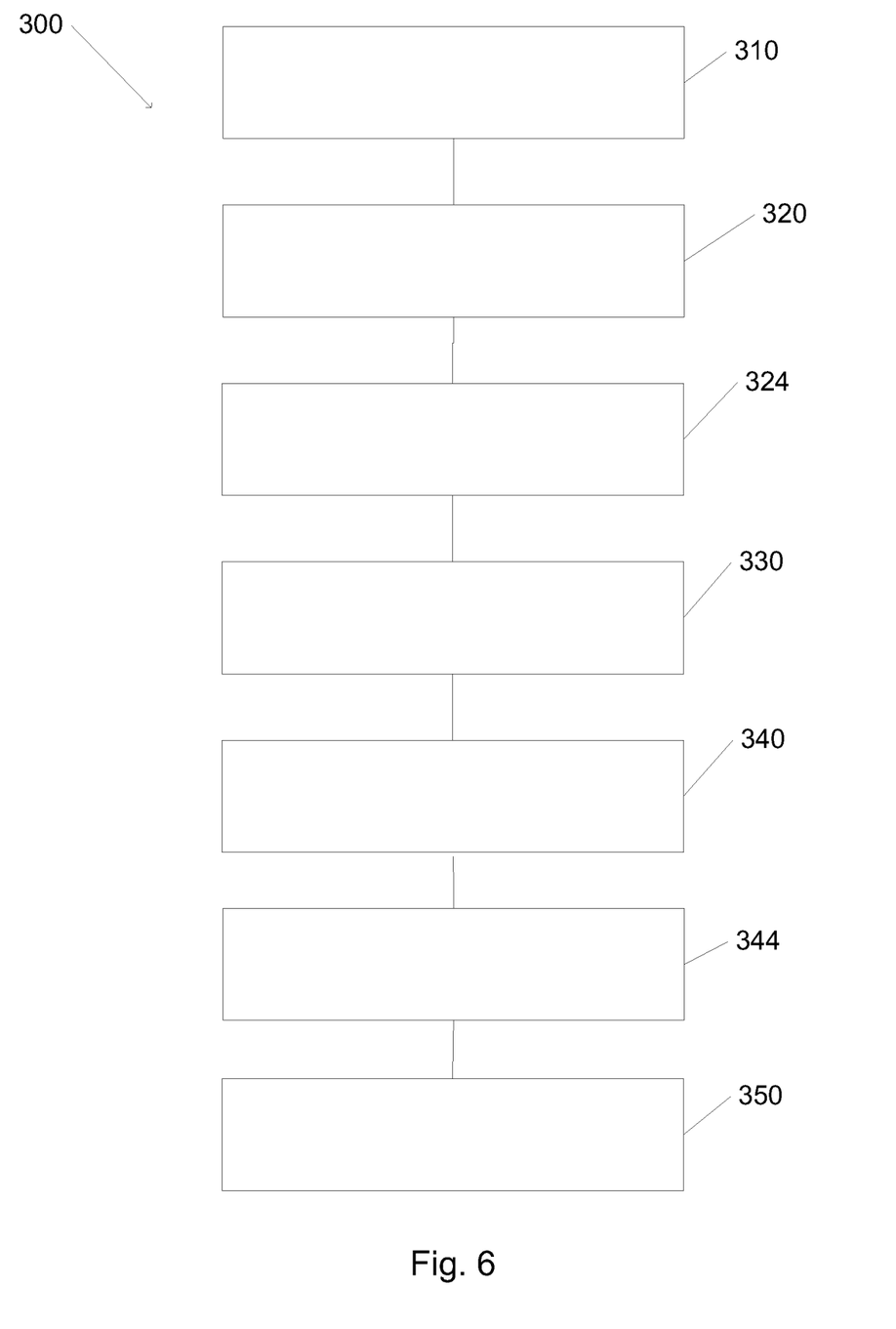
FIG. 6 shows a flowchart of an example of the method shown in FIG. 5.

FIG. 6 shows a flowchart of an example of the method shown in FIG. 5.

In performing rollover avoidance method 300, a load on tires of the vehicle may be calculated or determined (block 310). For example, information may be received from sensors that are configured to measure a vertical force on tires of the vehicle, including at least one pair of coaxial tires (e.g. front tires or rear tires on a four-wheeled vehicle).

For each pair of tires, a TLLT value may be calculated for at least one pair of coaxial tires (block 320). A calculated TLLT value may indicate the relative distribution of vertical force between tires of a coaxial pair that are located on opposite lateral sides of the vehicle (e.g. between a left-front and right-front tire, or between a left-rear and right-rear tire).

If the force sensor readings indicate that one of the tires of a coaxial pair of tires is lifted of the ground (is airborne), e.g. if the calculated TLLT value for that pair is close to 1 or to −1, an ABI value may be calculated for that pair. For example, an ABI value may be a function of the duration that the lifted tire has been airborne (e.g. a third power of the duration).

Sensor data that includes vehicle motion parameters may be input or obtained (block 324). For example, the obtained data may include one or more of: a yaw rate, a lateral acceleration, a vehicle speed, and a steering wheel (hand wheel) position, parameters related to a roadway on which the vehicle is traveling, an angle or orientation of a tire relative to the roadway, or other parameters. Additional quantities may be calculated or estimated on the basis of the obtained data. For example, a roll angle and rate of change of a roll angle may be estimated.

A roll energy of the vehicle and a rated of change of the roll energy may be calculated (block 330). For example, if the mass of the vehicle is M (e.g. 2740 kg or another value), and its roll moment of inertia is I (e.g. 1750 kg-m² or another value), a roll energy E may be calculated as (referring to coordinates illustrated in FIG. 4):

$$E = \frac{1}{2}I\dot{\varphi}^2 + \prod_{suspension}(\varphi) + MgZ(\varphi)$$

where a dot represents differentiation with respect to time, $\Pi_{suspension}$ represents the potential energy of the vehicle suspension system as a function of roll angle $\varphi$, $\dot{\varphi}$ represents the rate of change of roll angle $\varphi$ or time derivative of $\varphi$, g represents the acceleration of gravity, and $Z(\varphi)$ represents the height of the center of mass of the vehicle as a function of roll angle.

The roll energy rate may be calculated, for example, as:

$$\dot{E}=\dot{\varphi}\{-M[a_y(Y'\cos\varphi+Z'\sin\varphi)+a_z(-Y'\sin\varphi+Z'\cos\varphi)]-I_{xy}\dot{r}\}$$

where a prime represents differentiation with respect to $\varphi$, $a_y$ and $a_z$ are measured accelerations of the vehicle in the y and z directions, respectively, $I_{xy}$ represents a yaw-roll product of inertia (e.g. 552 kg-m² or another value) with respect to the x and y axes, and r represents a yaw rate.

Equivalent calculations of E and Ė may be used. Other or different formulas may be used.

On the basis of the calculated TLLT and ABI values, the calculated roll energy and roll energy rates, and stored coefficients or other factors (which may be dependent on vehicle speed or on other measured quantities related to vehicle motion), an RSI value may be calculated (block 340). For example, the RSI may be calculated using as a sum of terms as described above.

In accordance with an embodiment of the invention, an RSI may be calculated on the basis of a predicted motion of the vehicle that is based on measure quantities that are related to a current motion of the vehicle. For example, predicted motion of the vehicle after a given period of time (e.g. after 0.05 seconds, or another period) may be estimated by solving a system of differential equations of motion for the vehicle. As an example, equations of motion of a three degree-of-freedom vehicle model may include separate equations for lateral, yaw plane, and rolling motion of the vehicle.

For example, a lateral equation of motion may be expressed as:

$$M(\dot{V}_y+V_xr)+M_s(\dot{V}_y+V_xr-h_s\ddot{\varphi})=F_{yf}\cos(\delta_f+\gamma_f\varphi)+F_{yr}\cos(\delta_r+\gamma_r\varphi)$$

where M represents the total mass of a vehicle, $M_s$ represents the sprung mass of the vehicle (e.g., 2,369 kg or another value), r represents vehicle yaw rotation, V represents vehicle speed in the direction of the axis indicated by the subscript (and a dot indicates an acceleration in the indicated direction), the subscripts f and r indicate front and rear wheels, respectively, $\delta$ represents a road wheel angle of the indicated wheel, $\gamma$ represents a roll steer for the indicated tire (change of road wheel angle due to vehicle body roll), $h_s$ represents a center of gravity height, $\phi$ represents vehicle road wheel angle, $\ddot{\phi}$ represents vehicle road wheel angle acceleration (e.g., a double dot indicates a second derivative), and Fy represents a lateral load on the indicated tire.

A yaw plane equation of motion may be represented by:

$$I_z\dot{r}+I_{xz}\ddot{\phi}=aF_{yf}\cos(\delta_f+\gamma_f\phi)-bF_{yr}\cos(\delta_r+\gamma_r\phi)$$

where $I_z$ represents a vehicle moment of inertia about the z axis (e.g., vertical axis), $I_{xz}$ represents a product of inertia with respect to the x and z axes (e.g., yaw-roll inertia), $\dot{r}$ represents vehicle yaw rate, and a and b represent the distances of the front and rear axles from the center of gravity of the vehicle (e.g., 1.49 m and 1.45 m, respectively, or other values).

A roll equation of motion may be represented by:

$$I_x\ddot{\phi}+I_{xz}\dot{r}-M_sh_s(\dot{V}_y+V_xr)=M_zgh_s\sin\phi-K_\phi\phi-C_\phi\dot{\phi}$$

where $K_\phi$ represents a roll stiffness (e.g., 154,412 Nm/rad or another value), and $C_\phi$ represents a roll damping (e.g., 7,600 Nms/rad or another value).

Other equations may be used.

The equations may be solved, e.g. on the basis of assumptions concerning the steering angle during the given period of time (e.g. that the steering angle remains constant). The equations may be solved using an Euler scheme, e.g. with an integration step of 0.01 seconds or another step size, or using other numerical or other methods for solving a set of differential equations.

A predicted RSI may then be calculated at the future time.

The calculated RSI may be compared with one or more predetermined ranges (block 344). For example, one or more ranges of RSI values may be defined. For example, the ranges may be defined by a series of RSI threshold values, $T_1$, $T_2$, and $T_3$. (For example, in the case of some types of SUV, $T_1$, $T_2$, and $T_3$ may equal 1, 3, and 5, respectively, or other values.)

The rollover avoidance system may then control the vehicle based on the calculated RSI (block 350). The calculated RSI may include, for example, a current RSI value based on currently sensed motion, or a predicted RSI based on solving equations of motion of the vehicle. For example, calculated RSI value may indicate a risk of turning over. Thus, the rollover avoidance system may be configured so as to perform a more aggressive corrective action when the RSI value indicates imminent rolling over than when the RSI values a more remote or less likely likelihood of rolling over.

For example, controlling the vehicle may depend on the comparison between the calculated RSI and the predetermined ranges and threshold value. For example, when the calculated RSI is less than $T_1$, no corrective action may be necessary or performed and the rollover avoidance system allows control of the vehicle to proceed (e.g. under driver control or under control of another automatic or vehicle control system).

When the calculated RSI is between $T_1$ and $T_2$, a corrective action by the rollover avoidance system may be necessary or performed. For example, a calculated RSI between $T_1$ and $T_2$ may indicate a tire that is starting to lift off the ground. Corrective action may include, for example, applying partial braking to one or more wheels, adjusting a steering angle (e.g. of one or more tires), or modifying properties of (e.g. stiffening) a suspension system of the vehicle. When the calculated RSI is between $T_2$ and $T_3$, a more aggressive corrective action by the rollover avoidance system may be necessary. For example, a calculated RSI between $T_2$ and $T_3$ may indicate a tire has lifted off the ground. Corrective action may include, for example, applying increased braking to one or more wheels or increasing adjusting a steering angle. When the calculated RSI is greater than $T_3$, immediate or aggressive corrective action may be indicated. For example, a calculated RSI that is greater than $T_3$ may indicate a tire has lifted off the ground. Corrective action may include, for example, applying emergency braking to one or more wheels.

As more aggressive action is necessary, actions by the rollover avoidance system may be given greater precedence over actions by the driver or by other automatic vehicle control systems. For example, in a situation when various control mechanisms (e.g. a driver operating a steering wheel and control pedals, a collision avoidance system, or a lane centering system) are tending to operate the vehicle differently (e.g. steer in different directions), the rollover avoidance may be given precedence (e.g. control instructions by the rollover avoidance system are carried out despite the contradictory instructions from the other systems). As another example, actions by the rollover avoidance system may be coordinated with actions of other vehicle control mechanisms so as to control the vehicle in a manner that satisfies the requirements of each of the systems.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for determining rollover propensity comprising: providing a rollover avoidance system configured to: determine values of state variables at a future time of a traveling vehicle from current sensor data and a system of differential equations of motion, estimate values of roll energy and roll energy rate using the values of the state variables derived from the system of differential equation of motion at the future time prior to wheel lift, and calculate a future roll stability indicator (RSI) at least partially based on the roll energy and the roll energy rate, the RSI indicative of a tendency of rollover at the future time, initiate at least one corrective action responsively to a value of the RSI achieving a threshold value, wherein the lateral equation of motion is implemented as $$M(\dot{V}_y+V_x r)+M_s(\dot{V}_y+V_x r-h_s\ddot{\phi})=F_{yf}\cos(\delta_f+\gamma_f\phi)+F_{yr}\cos(\delta_r+\gamma_r\phi),$$

wherein M represents total vehicle mass $M_s$ represents vehicle sprung mass, r represents vehicle yaw rotation $V_y$ dot and $V_x$ represents y-axis acceleration and x-axis velocity, respectively, $\delta_f$ and $\delta_y$ represent front and rear road wheel angle, respectively, $\gamma_r$ and $\gamma_t$ represent front and rear roll steer, respectively, $h_s$ represents center of gravity height, $\phi$ represents vehicle road wheel angle $\ddot{\phi}$ represent vehicle road wheel angle acceleration.

2. The method of claim 1 wherein the yaw plane equation of motion is implemented as $I_z\dot{r}+I_{xz}\ddot{\phi}=aF_{yf}\cos(\delta_f+\gamma_f\phi)-bF_{yr}\cos(\delta_r+\gamma_r\phi)$, wherein
$I_z$ represents vehicle moment of inertia about the z-axis, $I_{xz}$ represents product of inertia with respect to x and z axes, r represent vehicle yaw rate, and a and b represent distances of front and rear axles from center of gravity of the vehicle.

3. The method of claim 2 wherein the roll equation of motion is implemented as $I_x\ddot{\phi}+I_{xz}\dot{r}-M_s h_s(\dot{V}_y+V_x r)=M_s g h_s \sin\phi-K_\phi\phi-C_\phi\dot{\phi}$, wherein
$I_x$ represents a vehicle moment of inertia about the x-axis, $\ddot{\phi}$ represents vehicle road wheel angle acceleration, $I_{xz}$ represents a product of inertia with respect to x and z axes, $\dot{r}$ represents vehicle yaw rate, $M_s$ represents vehicle sprung mass, $h_s$ represents center of gravity height, $V_y$ dot and $V_x$ represent y-axis acceleration and x-axis velocity, respectively, r represents vehicle yaw rotation, $\phi$ represents vehicle road wheel angle, $K_\phi$ represents roll stiffness, $C_\phi$ represents roll damping, and $\dot{\phi}$ represents vehicle road wheel angle velocity.

4. The method of claim 1, wherein the future time is implemented at a time equal to or greater than about 0.05 seconds following capture of the current sensor data.

5. The method of claim 1, wherein the corrective action is selected from a group consisting of partial braking of one or more wheels, steering one or more wheels, and adjusting a suspension stiffness.

6. A system for determining propensity of vehicular rollover comprising: a rollover avoidance system including: a plurality of vehicle-dynamic measurement devices configured to measure current vehicle dynamic parameters, and a processor configured to calculate: values of state variables at a future time of a traveling vehicle from the vehicle dynamic parameters and a system of differential equations of motion, the system of differential equations of motion including a lateral equation of motion, a yaw plane equation of motion, and a roll equation of motion, a future roll stability indicator (RSI) at least partially based on roll energy and roll energy rate based on values of state variables at a future time prior to wheel lift based on current data received from the vehicle dynamic measurement devices, the RSI indicative of a tendency of rollover at the future time, wherein the rollover avoidance system is configured to apply corrective action responsivley upon a value of the RSI achieving a threshold value, the correction action selected from a group consisiting of braking, steering and suspension stiffness adjustment, and wherein the lateral equation of motion is implemented as $$M(\dot{V}_y+V_x r)+M_s(\dot{V}_y+V_x r-h_s\ddot{\phi})=F_{yf}\cos(\delta_f+\gamma_f\phi)+F_{yr}\cos(\delta_r+\gamma_r\phi)$$

wherein M represents total vehicle mass $M_s$ represents vehicle sprung mass, r represents vehicle yaw rotation $V_y$ dot and $V_x$ represents y-axis acceleration and x-axis velocity, respectively, $\delta_f$ and $\delta_y$ represent front and rear road wheel angle, respectively, $\gamma_r$ and $\gamma_t$ represent front and rear roll steer, respectively, $h_s$ represents center of gravity height, $\phi$ represents vehicle road wheel angle, and $\ddot{\phi}$ represent vehicle road wheel angle acceleration.

7. The system of claim 6, wherein the yaw plane equation of motion is implemented as $I_z\dot{r}+I_{xz}\ddot{\phi}=aF_{yf}\cos(\delta_f+\gamma_f\phi)-bF_{yr}\cos(\delta_r+\gamma_r\phi)$, wherein
$I_z$ represents vehicle moment of inertia about the z-axis, $I_{xz}$ represents product of inertia with respect to x and z axes, $\dot{r}$ represents vehicle yaw rate, and a and b represent distances of front and rear axles from center of gravity of the vehicle.

8. The system of claim 7, wherein the roll equation of motion is implemented as $I_x\ddot{\phi}+I_{xz}\dot{r}-M_s h_s(\dot{V}_y+V_x r)=M_s g h_s \sin\phi-K_\phi\phi-C_\phi\dot{\phi}$, wherein $I_x$ represents a vehicle moment of inertia about the x-axis, $\ddot{\phi}$ represents vehicle road wheel angle acceleration, $I_{xz}$ represents product of inertia with respect to x and z axes, $\dot{r}$ represents vehicle yaw rate, $M_s$ represents vehicle sprung mass, $h_s$ represents center of gravity height, $V_y$ dot and $V_x$ represent y-axis acceleration and x-axis velocity, respectively, r represents vehicle yaw rotation, $\phi$ represents vehicle road wheel angle, $K_\phi$ represents roll stiffness, $C_\phi$ represents roll damping, and $\dot{\phi}$ represents vehicle road wheel angle velocity.

9. The system of claim 8, wherein the future time is implemented at a time equal to or greater than about 0.05 seconds following capture of the current vehicle dynamic parameters.

10. The system of claim 8, wherein the plurality of vehicle dynamic measurement devices is selected from the group consisting of a yaw rate sensor, an acceleration sensor, a steering wheel position sensor, and a tire orientation sensor.

* * * * *